Sept. 2, 1958 P. R. VAN SITTERT 2,850,128
ROTARY IMPACT CLUTCH
Filed Aug. 1, 1952 3 Sheets-Sheet 1

INVENTOR.
PAUL R. VAN SITTERT
BY Woodling and Krost
attys

Sept. 2, 1958  P. R. VAN SITTERT  2,850,128
ROTARY IMPACT CLUTCH
Filed Aug. 1, 1952  3 Sheets-Sheet 2
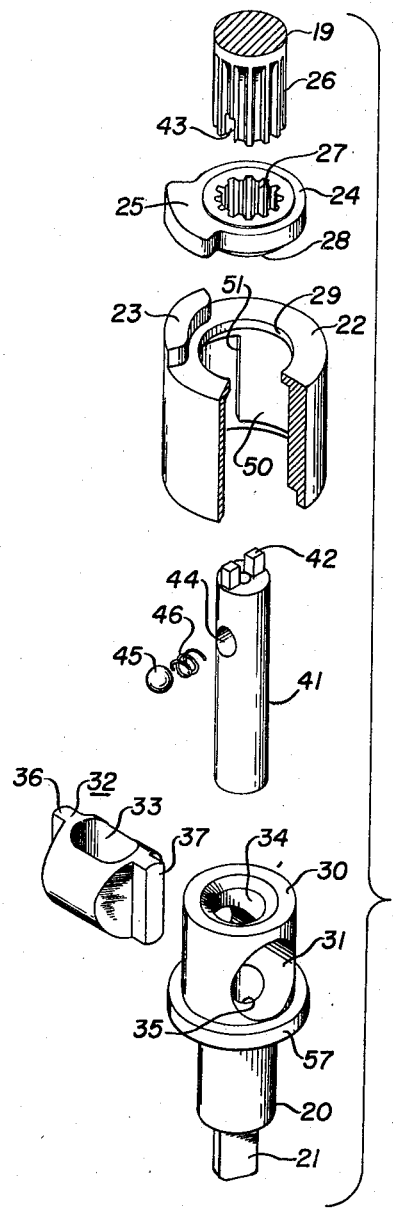
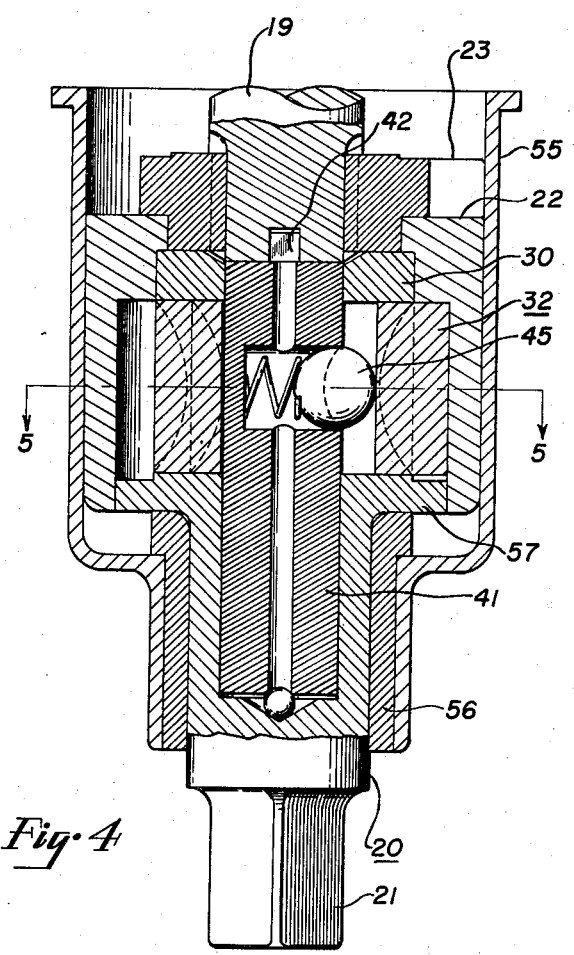
Fig. 4
Fig. 3
INVENTOR.
PAUL R. VAN SITTERT
BY Woodling and Krost
attys INVENTOR.
PAUL R. VAN SITTERT
BY Woodling and Kroet
attys

United States Patent Office 2,850,128
Patented Sept. 2, 1958

2,850,128
ROTARY IMPACT CLUTCH

Paul R. Van Sittert, Cleveland, Ohio, assignor to The Rotor Tool Company, a corporation of Ohio Application August 1, 1952, Serial No. 302,273

17 Claims. (Cl. 192—30.5)

This invention relates to rotary impact clutches adapted to drive a driven shaft at high speed under low resistance forces, and subsequently to deliver a series of rotary impact blows under high driven shaft resistance.

An object of this invention is to provide a positive positioning of hammer and anvil into full faced impact position at all rotary speeds.

Another object of this invention is to prevent partial or glancing blows between hammer and anvil at all rotary speeds.

Another object of this invention is to provide impacting surfaces with no declutching forces as a result of impact, but rather having all forces employed in driving the load, and providing auxiliary means to declutch the parts and reposition the parts for a succeeding impact.

Another object of this invention is to provide a rotatable hammer member and work spindle engaged with each other by means of an impact key carried by the work spindle and shiftable from one impact position to another impact position alternately and transmitting only a circumferential force, and having yieldable means disposed to alternately withdraw the impact key from one impact position and move it to the other, said yieldable means arranged to produce a withdrawal force capable of overcoming friction of the driving member but incapable of overcoming friction resulting from impact loads.

Other objects and a fuller understanding of the invention may be had by referring to the following description and claims, taken in conjunction with the accompanying drawings, in which:

Figure 3 is a sectional view through the impact clutch portion only of an impact tool made according to the teachings of this invention, the construction differing from that of Figure 1 only in the use of a spring instead of air pressure to urge the clutch to disengage;

Figure 4 is an exploded view of the impact clutch parts as shown in Figure 3.

Figures 1, 2:
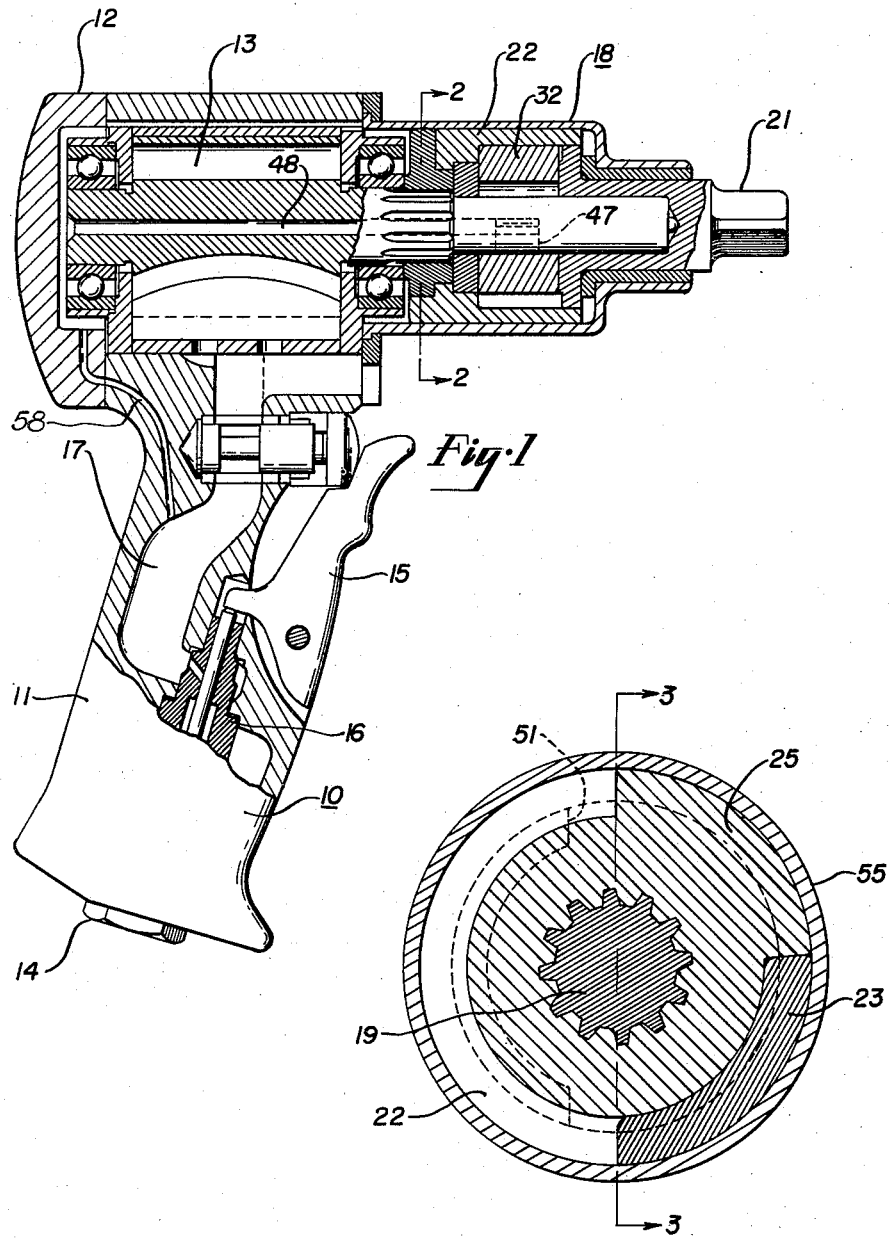
Figure 1 is a sectional view through a rotary impact tool made according to the teachings of this invention.
Figure 2 is a section taken along line 2—2 of Figure 1.

Figure 1 of the drawings illustrates a common type of arrangement of an impact tool 10 wherein a pistol grip handle 11 and a motor housing 12 are provided to support an air motor 13 and an impact clutch 18. An air line coupling 14 is provided to attach a suitable air line to the tool. A trigger 15 is in convenient position for actuation by the operator. Valve 16, operated by trigger 15, controls the supply of air through an air line 17 to the air motor 13.

The invention in this case is directed toward the impact mechanism. Impact mechanisms are now well known in the trade and are used for interconnecting a driving and a driven shaft for direct drive transmission until a preselected resistance is encountered to the rotation of the driven shaft, whereupon the clutch mechanism begins a series of impact raps designed to drive the driven member through a series of short but intense impact blows. Thus, a small driving motor can produce a greater tightening of a workpiece than could be accomplished by a considerably larger device operating solely by torque, and with no reaction to the operator.

Figures 3 and 4 of the drawings illustrate the preferred construction of the present invention. A drive shaft 19 illustrates a rotatable source of power, such for example as the shaft of air motor 13. Preferably shaft 19 is an integral part of the driving motor. A driven shaft 20, having a shank 21 thereon for holding sockets and similar tools, is located in an axially aligned position with respect to shaft 19 for convenience of construction and operation.

A hammer member 22, constructed in the general form of a cylinder, is provided with a dog 23 as illustrated in Figure 4. A collar 24 is seated in an opening 29 of the hammer 22 and guided for rotary movement with respect to the hammer 22 by a shoulder 28 fitting into the opening 29. The collar 24 is provided with a lug 25 to engage the dog 23. The collar 24 is nonrotatively engaged with the drive shaft 19 by means of a plurality of splined teeth 26 and 27. Thus, the hammer and driving shaft have substantially one half revolution of limited rotation relative to one another, and therefore upon reversing of the rotary direction of the shaft 19, the relative positions of the hammer 22 and shaft 19 will be shifted substantially 180 degrees. In clockwise operation of shaft 19 the drive shaft and hammer will assume one relative position and in counterclockwise operation of the drive shaft 19 the hammer and shaft will assume a reversed position. Thus, the illustrated embodiment of the invention is reversible.

As previously stated, the hammer 22 is substantially cylindrical in shape. An anvil guide 30 is integrally formed with the driven shaft 20 and extends into the interior of the hammer 22. Guide 30 has a lateral guideway 31 therethrough. A shiftable key 32 fits closely within the guideway 31 and is laterally shiftable with respect to the longitudinal axis of the guide 30 and hammer 22. There is a vertical elongated slot 33 extending through the key 32. An axial path comprising an opening 34 and a bore 35 operates in conjunction with the slot 33 to define an axial passageway.

A shaft 41, which in fact may be an extension of drive shaft 19 or keyed thereto by means of the key 42 and slot 43, resides within the passageway defined by opening 34, the slot 33, and the bore 35. A transverse chamber 44 is provided in the side of the shaft 41, and houses a ball 45 with a compression spring 46 behind the ball. Upon relative rotation of the shafts 19 and 20, the ball 45 will travel around the inside surface of the slot 33 and, when the pressure of the ball 45 is in the proper direction, will cause the key 32 to shift in the guideway 31. When the shafts 19 and 20 rotate in unison, as when a loose nut is first being turned down, the ball 45 does not travel around the inside surface of the slot 33, since the drive shaft 41 does not turn relative to the slot but turns as a unit with the key 32.

In Figure 1 of the drawings a slight modification of the ball and spring method is shown, wherein a piston 47 replaces the ball 45. Air passages 58 and 48 connect from the motor air supply to the chamber behind the piston 47 and therefore resiliently urge the piston 47 outwardly in exactly the same manner as the spring 46 resiliently urges the ball 45 outwardly.

In all impact clutch constructions the problem has been to obtain the best possible full faced impact between the hammer and anvil members, and provide some means for separating the impact members and reposition the impact members for reimpacting at some later period after the driving member has had an opportunity to regain its speed. Tapered impact surfaces have long been used whereby a portion of the impact blow is employed to drive the anvil member and a small component of the impact force is used to move one or another of the members and cause a disengagement and a possible repositioning. Such a device cannot deliver the full impact of which it is potentially capable. Various other schemes are employed for this purpose.

Figure 5:
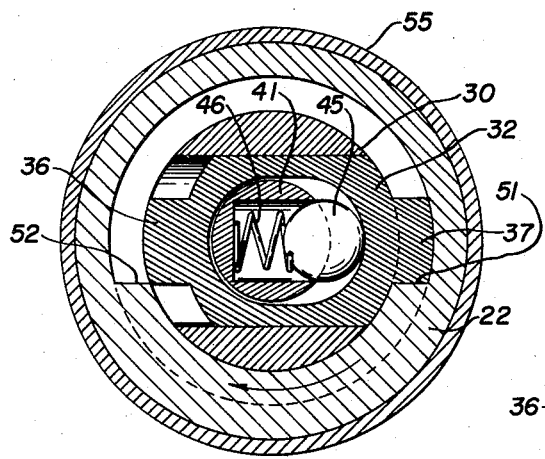
Figures 5 through 8 illustrate the action of the hammer and key through an operating cycle during impact drive in a clockwise direction.
Figure 6:
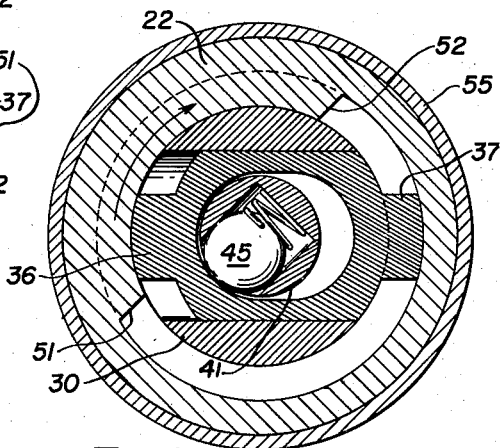
Figure 7:
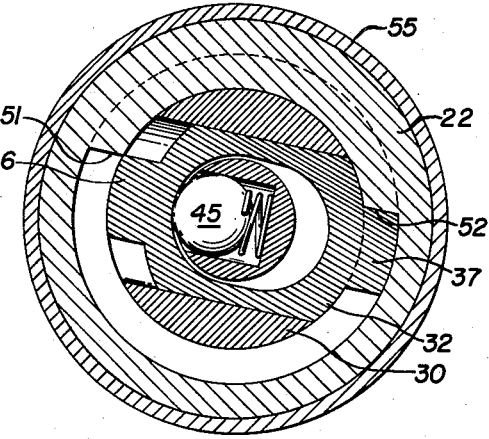

In this invention the hammer 22 is provided with an internal stepped guide track 50 having two arcuate sections having different radii with impact shoulders 51 and 52 at the ends thereof. The impact shoulders 51 and 52 are straight flat faces and have no cam action. The key 32 is provided with impact members 36 and 37 having ends for frictional engagement with said arcuate track sections and straight sides for impact with the shoulders 51 and 52. As best shown in Figure 3 or in the series of Figures 5 through 8, the distance across the key 32 from the ends of the impact members 36 and 37 is substantially equivalent to the distance from the surface of the guide track 50 to the opposite smaller diameter interior track wall of the hammer 22. Thus, as illustrated in Figure 5, the sides of both impact members 36 and 37 cannot engage both impact shoulders 51 and 52 at the same time. Furthermore, as illustrated in Figure 6, the key 32 cannot shift laterally whenever the end of one of the impact members 36 or 37 is engaged with the smaller radius track surface of the guide track 50. Therefore, key 32 is held in impact position by the guide track 50 until either the relative rotative speed of drive and driven shafts is great enough to cause impact to occur between the impact shoulder of the hammer and the impact member of the key before the spring 46 can move an impact member 36 or 37 out of the path of a hammer shoulder, or the relative rotative speed of the drive and driven shafts is so small as to allow the spring 46 to shift the key 32 to remove an impact member out of the path of a hammer shoulder just prior to said shoulder reaching impact position. However, the circumferential length of the guide track 50 is such that the impact shoulders 51 and 52 extend chordally of the circular cross section of hammer member 22 and are substantially aligned with the side surfaces of the impact members 36 and 37 whenever impact occurs, and therefore there is provided a path in which the key 32 may shift in a lateral direction. Only at the one relative position, as illustrated in Figure 5 or 7, is it possible for the key 32 to shift. Otherwise, the impact member of the key is held in position until fully impacted by the impact shoulder of the hammer member.

After the impact below has been delivered from the hammer to the anvil, the members must be relatively shifted in order to allow the hammer to regain its speed, and the members must then be relatively positioned for a later impact. The shaft 41 carries the means for urging the key to shift laterally. In Figures 3 and 4 it is the ball and spring 45 and 46, and in Figure 1 it is the air piston 47 with its air passages 58 and 48. Shaft 41 rotates with shaft 19, but the key 32 rotates only when there is relative rotative movement between shafts 41 and 20 or after there has been engagement between an impact shoulder and an impact member. For proper use the pressure brought by the urging means must act in the laterally withdrawing direction of the impacting surfaces. Thus, the dog 23 and lug 25 are positioned such that in a clockwise rotation of the shaft 19, the urging means will be pressing in one direction from shoulder 52, but upon reversal of the direction of rotation of shaft 19 and shaft 41, there will be 180 degrees of lost motion until the key 25 picks up the opposite side of dog 23, and consequently the urging means will then be oppositely disposed and will urge the key 32 to move away from the direction of impact shoulder 51.

The strength of the urging means, whether spring 46 or air pressure through lines 58 and 48, need not be great, but sufficient only to alternately position the end surfaces of impact members 36 and 37 in frictional engagement with the guide track 50 and to move the key 32 against the normal driving frictional engagement between the side walls of the impact members and thereby prevent stalling under a gradual build-up of resistance. The urging means must not be sufficiently strong to move the key 32 under the greatly multiplied frictional engagement experienced under impact.

In operation, therefore, as is best illustrated in the series of Figures 5 through 8, the hammer rotates and engages the key 32 to drive the shaft 20. As long as resistance to rotation is minor, all of the clutch members will rotate in unison rather than overcoming the urge of spring 46 or the air pressure on piston 47. However, as soon as resistance to rotation of shaft 20 increases, the rotational speed of the shaft 20 will decrease sufficiently relative to the driven hammer 22 so that impacts will then be transmitted from hammer 22 to key 32.

To illustrate the use of the illustrated embodiment of the invention, reference is made to the Figures 5 through 8. In Figure 5 impact shoulder 52 has either just impacted with impact member 36, or the difference in relative speed of rotation between the drive shaft 19 and the driven shaft 20 is not sufficient to allow the impact shoulder 52 to strike and hold the key 32 before the key 32 has been moved by spring and ball 45 and 46 to the position illustrated in Figure 5. Rotation of hammer 22 is in a clockwise direction as illustrated by the arrow in Figure 5. Upon shifting of the key 32 to the position illustrated in Figure 5, the path of travel, or orbit, of the guide track 50 is cleared, and the hammer 22 can resume its rotary movement. Upon resuming the rotation of the hammer member 22, the end surface of impact member 36 will just clear the smaller inside surface of guide track 50. It cannot move to the left in Figure 5 because the hammer 22 has continued or has again commenced relative rotation with respect to the key 32. See Figure 6. In Figure 6 there is no place for the key 32 to move. It must remain fixed laterally with respect to the hammer 22 and the impact shoulder 52. Thus, full impact is assured between shoulder 52 and the impact member 37.

Note that the means urging disengagement is rotating within the slot 33 at all times when there is relative rotation between the drive and driven shafts and, therefore, presses in a withdrawing direction at each impact position when the axis of spring 46 is aligned with the reciprocation path of key 32. However, no movement of the key is permitted so long as the guide track 50 is in engagement with the opposite impact member.

As a nut is being freely turned down by the tool with little or no resistance to torque, the friction between the ends of the members 36 and 37 and the smaller diameter track 50 caused by ball 45 pressing against the slot 33, causes all parts including the hammer 22 and shaft 20 to rotate as a unit, since the urging means 45 and 46 do not rotate within the slot 33 at this time. However, when the nut meets resistance to being turned down and causes the shaft 20 to decelerate below the speed of rotation of the hammer 22, the urging means 46 begins to rotate in this slot 33 as shown progressively in Figures 5 to 7 ready to shift the key or anvil 32 to the left of Figure 7 and into the position shown in Figure 8. If the difference in relative speeds is not too great, the urging means 46 will reach a position where it will shift the key 32 to the left of Figure 7 to the position shown in Figure 8 just prior to the shoulder 52 reaching a position to strike the anvil 37, and such shifting of the key back and forth in and out of the path of the shoulder 52 will continue until the hammer 22 attains sufficient acceleration and kinetic energy to cause the shoulder 52 to impart a blow to an anvil before the urging means has a chance to retract the anvil out of this path. At the instant of dissipation of momentum after such impact, with consequent lessening of friction between impact surfaces, the spring pressed ball 45 in riding around on the walls of the slot 33 will have arrived at the approximate position shown in Figure 7 where the pressure exerted by the spring 46 is in the direction where the inner surface 50 of the hammer has just been removed as a block to the movement of the key 32, thereby permitting the latter to be moved to tne position shown in Figure 8 where the anvil 36 is then arranged in the path or orbit of the revolving hammer 52 for a subsequent impact. Thus, by the action of the urging means being controlled by the relative rotation of the drive and driven shafts, the hammer 22 is given the opportunity to accelerate and deliver forceful full faced impacts to the anvils.

Figure 8:
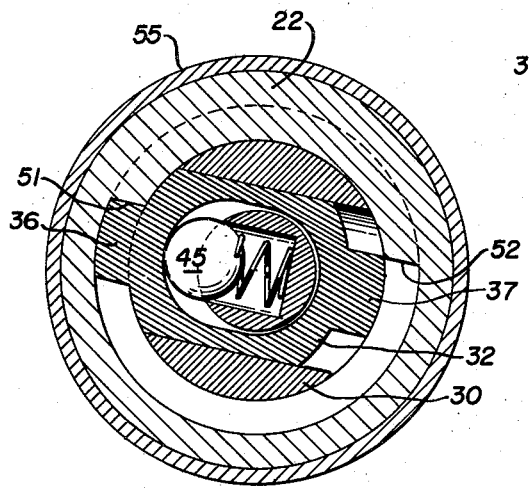

In Figure 7, assume that the relative speeds of the shafts is such that impact has been accomplished between shoulder 52 and member 37. Ball 45 is pressing in the opposite direction toward the impact member 36. Upon engagement of impact shoulder 52 with member 37, and only at this relative position after an impact, impact shoulder 51 is clear of the impact member 36, and therefore lateral shifting of key 32 will take place. Shifting can be accomplished, that is, provided there is no other force holding the key 32. Although the force of spring 45, or the air pressure illustrated in Figure 1, is considerable; nevertheless, it is less than sufficient to cause shifting of key 32 so long as the impact shoulder is in a state of impact against an impact member. However, as soon as the impact is dissipated and only the contact friction remains, then the key 32 can shift, and will shift, to the position illustrated in Figure 8 of the drawings. Figure 8 is the exact opposite condition of that illustrated in Figure 5. Note the rotational advancement in the Figures 7 and 8, illustrating the fact that anvil guide 30 of shaft 20 has been driven a short distance under the impact.

Upon reversal, the same operation takes place, but impact shoulder 51 is the principal operating shoulder.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An impact clutch comprising, revolvable hammer means having a substantially cylindrical wall structure with a first internal wall portion of relatively large diameter and a second internal wall portion of relatively small diameter, first and second chordally extending impact shoulder portions joining said wall portions, a revolvable shaft extending axially of said hammer means, revolvable anvil means having an opening therethrough, said anvil positioned within said hammer with the shaft extending through said opening thereof, said opening dimensioned to allow lateral shifting of the anvil with respect to the shaft and hammer, chordally extending impact receiving anvil shoulders carried by said anvil in oppositely disposed relationship, said hammer shoulders and anvil shoulders adapted to transfer substantially only a rotary component of force upon impact with substantially no cam action tending to separate said shoulders, the distance across said anvil from the end of one anvil shoulder to the other being substantially equal to the distance across the interior of said cylindrical hammer from the surface of the first internal wall to the surface of the second internal wall, said first and second impact shoulder portions positioned to one side of the axis of the hammer in a position to allow said anvil to move only whenever the impact surfaces of the anvil and hammer are in substantially full contact, and resilient means carried by said shaft in timed relationship with said hammer and pressing in a lateral direction upon said anvil to urge the anvil to move the engaged shoulders out of engagement and position the hammer and anvil for impact at a further advanced rotary position.

2. An impact clutch comprising, a rotatable driving shaft, a rotatable driven shaft in axial alignment with said driving shaft, a rotatable hammer member driven by said driving shaft, said hammer having a first cylindrical internal wall, a second cylindrical wall, said second cylindrical wall having smaller diameter than said first cylindrical wall, first and second shoulder impact surfaces connecting between the said first and second cylindrical walls, said shoulder impact stations extending laterally with respect to the rotary orbits thereof, a laterally shiftable anvil member connected in driving relationship to said driven shaft, said anvil member having two oppositely disposed impact receiving members, the diameter of said anvil member being substantially equal to the diameter of said second cylindrical wall plus half the difference between the diameter of said first and second cylindrical walls, said impact receiving members each having two parallel impact receiving walls extending laterally with respect to the rotary orbits thereof, and with like walls of each impact receiving member lying on a straight line lying laterally of the rotational axis of said impact clutch, said first and second shoulder impact surfaces positioned on a straight line extending laterally of the rotational axis substantially equal to said straight line of the impact receiving members, a central shaft extending axially into said anvil member, said central shaft driven in rotary unison with said hammer member, and resilient means carried by said central shaft and pressing against said anvil member in a lateral direction, said resilient means positioned to press in the direction of the shoulder impact surface receding from an impact receiving member.

3. In combination, a rotatable driving member, a driven member substantially coaxial therewith, hammer means revolvably driven by said driving member, said hammer means having a semi-circular guide track with impact shoulders at each end thereof, an impact key carried nonrotatively and transversely shiftable by said driven member, said impact key having a length to position a first end thereof in contact with said track and a second end thereof extending across the path of said track in position to impact with a shoulder of the track upon rotation of the hammer, said track being of a length to position one shoulder thereof against one end of the impact key and the other shoulder substantially adjacent an extension of the other end of the key thereby providing only one relative position of key and track in which the key can shift, and means urging said key in a direction to withdraw said second end of the key out of the path of said track and place the first end in said path for impact of the first end upon further rotation of the track of the hammer member.

4. In combination, a rotatable driving member, a driven member substantially coaxial therewith, hammer means revolvably driven by said driving member, said hammer means having a semi-circular guide track with impact shoulders at each end thereof, an impact key carried nonrotatively and transversely shiftable by said driven member, said impact key having a length to position a first end thereof in contact with said guide track and a second end thereof extending across the path of said guide track in position to impact with a shoulder of the guide track upon rotation of the hammer, said guide track being of a length to position one shoulder thereof against one end of the impact key and the other shoulder substantially adjacent an extension of the other end of the key thereby providing only one relative position of key and guide track in which the key can shift, and means rotatable with said driving member for urging said key in a direction to withdraw said second end of the key out of the path of said guide track and place the first end in said path for impact of the first end upon further rotation of the guide track of the hammer member.

5. In combination, a rotatable driving member, a driven member substantially coaxial therewith, hammer means revolvably driven by said driving member with substantially one half revolution of limited rotation relative to said driving member, said hammer means having a semicircular guide track with impact shoulders at each end thereof, an impact key carried nonrotatively and transversely shiftable by said driven member, said impact key having a length to position a first end thereof in contact with said guide track and a second end thereof extending across the path of said guide track in position to impact with a shoulder of the guide track upon rotation of the hammer, said guide track being of a length to position one shoulder thereof against one end of the impact key and the other shoulder substantially adjacent an extension of the other end of the key thereby providing only one relative position of key and guide track in which the key can shift, and means rotatable with said driving member for urging said key in a direction to withdraw said second end of the key out of the path of said guide track and place the first end in said path for impact of the first end upon further rotation of the guide track of the hammer member.

6. An impact clutch comprising, a drive shaft, a hammer member driven by said drive shaft and mounted for substantially one half revolution of limited rotation relative to said drive shaft, a driven shaft, an impact key carried by said driven shaft and shiftable transversely with respect to said driven shaft and rotatable therewith, impact surfaces on said hammer member engageable with said impact key, means rotatable with said drive shaft and having substantially one half revolution of limited rotation relative to said hammer member urging said impact key out of engagement with said impact surfaces, and a track on said hammer member engaging said impact key to prevent shifting of said impact key prior to impact with said impact surfaces.

7. An impact clutch comprising, a drive shaft, a hammer member operatively connected to and driven by said drive shaft, a driven shaft, an impact key carried by said driven shaft and shiftable transversely with respect to said driven shaft and rotatable therewith, impact surfaces on said hammer member engageable with said impact key, means urging said impact key out of engagement with said impact surfaces, and a track on said hammer member engaging said impact key to prevent shifting of said impact key prior to impact with said impact surfaces.

8. An impact clutch comprising, a hammer member having impact surfaces thereon, driving means operatively connected to and adapted to drive said hammer member, a rotatable driven member, one or more impact keys carried by said driven member and movable relative thereto, said impact surfaces being arranged to engage and disengage said impact keys, means independent of said hammer surfaces and impact keys urging said impact keys to disengage said impact surfaces, and track means engageable with said impact keys to restrain said impact keys against premature disengagement.

9. An impact clutch comprising, a rotatable driven shaft, an impact key carried by said driven shaft and shiftable thereon from a first impact position to a second impact position, a rotatable hammer member, impact surfaces on said hammer member arranged to strike said impact key circumferentially to exert a rotating force on said driven shaft, yieldable means tending to move said impact key alternately from one impact position to the other, and guide means movable in accordance to the movement of said hammer member and engageable with said impact key to prevent shifting of said impact key before the striking position is reached.

10. An impact clutch comprising, a motor, a hammer member operatively connected to and rotated by said motor, a work spindle, an impact key carried by said work spindle and shiftable relative to said work spindle from one impact position to another impact position, impact surfaces on said hammer member adapted to strike said impact key in one impact position and then the other alternately to produce a circumferential force only tending to rotate said work spindle, and yieldable means cooperating with said impact key to move the same from one impact position to the other alternately and constructed to produce a withdrawal force capable of overcoming friction between an impact surface and said impact key resulting from the torque of said motor but incapable of overcoming friction between an impact surface and said impact key resulting from impact loads.

11. An impact clutch comprising, a motor, a hammer member driven by said motor, a rotatable shaft, one or more anvil members rotatable with said shaft but shiftable relative thereto into one of a sequence of impact positions, one or more impact shoulders on said hammer member adapted to strike said anvil for imparting a rotary impact to said shaft, means producing a force on said anvil sufficient to disengage said anvil from said impact shoulders despite the torque of said motor but insufficient to effect such disengagement before the momentum has been dissipated through the impact, and track means compelling said anvil to remain in a fixed position until struck by said impact shoulder.

12. An impact clutch comprising, a motor, a hammer member driven by said motor, a rotatable shaft, one or more anvil members rotatable with said shaft but shiftable relative thereto into one of a sequence of impact positions, one or more impact shoulders on said hammer member adapted to strike said anvil for imparting a rotary impact to said shaft, fluid operated piston and cylinder means producing a force on said anvil sufficient to disengage said anvil from said impact shoulders despite the torque of said motor but insufficient to effect such disengagement before the momentum has been dissipated through the impact, and track means compelling said anvil to remain in a fixed position until struck by said impact shoulder.

13. An impact clutch comprising, a rotatable hammer member having one or more impact shoulders thereon, a rotatable shaft in axial alignment with said hammer member, one or more anvil members rotatable with said shaft but shiftable relative to said shaft into and out of the path of said impact shoulders, guide means carried by said hammer member and cooperating with said anvil members to insure full faced registration of said anvil members with said impact shoulders, and disengaging means cooperating with said anvil members for separating said anvil members from said impact shoulders after impact therebetween, characterized in that the force of the disengaging means is independent of the torque transmitted.

14. An impact clutch comprising coaxial relatively rotatable drive and driven members, said drive member having radial hammer shoulders and a guide track surface, said driven member having a radially shiftable clutch element with a pair of anvils at its ends with impact surfaces alternately positionable in the path of movement of said hammer shoulders and restrained in radial position by said track surface to create friction therewith and to be rotated thereby, and clutch element shifter means operated by relative rotation between said drive and drive members and including pressure means to shift said clutch element only at positions where said striking surfaces are substantially parallel with said hammer shoulders and where its radial movement is unrestrained by said track surface while said pressure means is positioned to induce radial movement of said clutch element to alternately position said striking surfaces in the path of movement of said hammer shoulder.

15. An impact clutch comprising a rotary drive member and a coaxial relatively rotatable driven member, a stepped track surface and a radial hammer impact surface on said drive member, an impact key rotatable with said driven member and shiftable transversely thereof, said key having opposite ends simultaneously disposable adjacent the step in said stepped track surface whereby one end of said key is normally held projected into the path of movement of said hammer impact surface by the other end of said key engaging said track surface, and key projection means rotatable with said drive member and rotatable relative to said driven member during relative rotation of said members but non-rotatable relative to said driven member during rotation of said members as a unit, said key projection means normally pressing one end of said key into frictional contact with said track surface whereby said key and driven member are driven as a unit with said drive member until said drive and driven members are rotated relatively at which time said key projection means is rotated relative to said key to cause it to shift its position and move its projected end out of the path of said hammer impact surface until said drive member attains sufficient relative speed of rotation to carry its impact surface into full face impact with said projected end of said key and thereby prevent said key from re-shifting until momentum of said impact has been dissipated at which time said key projection means is active to move said projected end of the key out of said path and into frictional engagement with said track surface while moving the other end of said key into said path.

16. An impact clutch comprising in combination a rotatable driving member, a driven member substantially coaxial therewith, hammer means movable in accordance to the movement of one of said driving and driven members, said hammer means having a semi-circular guide track with impact shoulders at each end thereof, an impact key carried by the other of said driving and driven members and being transversely shiftable relative thereto, said impact key having a length to position one end thereof in contact with said track and another end thereof across the path of said track in position to impact with a shoulder of said track, said track being of a length to position one shoulder thereof against one end of said impact key and the other shoulder substantially adjacent the other end of said key thereby providing only one relative position of key and track in which said key may shift, and means urging said key in a direction to withdraw said one end of said key out of the path of said shoulder of said track and place the other end in said path for impact of said other end upon further rotation of said driven member.

17. An impact clutch comprising a drive and a driven shaft, a hammer member operatively connected to one of said drive and driven shafts, an impact key carried by the other of said driven and driven shafts and shiftable transversely with respect thereto and rotatable therewith, impact surfaces on said hammer member engageable with said impact key, means urging said impact key out of engagement with said impact surfaces, and a track on said hammer member engaging said impact key to prevent shifting of said impact key prior to impact with said impact surfaces.

References Cited in the file of this patent
UNITED STATES PATENTS

| | | |
|---|---|---|
| 2,256,496 | Robinson | Sept. 23, 1941 |
| 2,347,125 | Robinson | Apr. 18, 1944 |
| 2,373,664 | Emery | Apr. 17, 1945 |
| 2,439,756 | Shaff | Apr. 13, 1948 |
| 2,539,930 | Robinson | Jan. 30, 1951 |
| 2,575,523 | Mitchell | Nov. 20, 1951 |